(12) United States Patent
Yamamoto et al.

(10) Patent No.: US 11,449,734 B2
(45) Date of Patent: Sep. 20, 2022

(54) NEURAL NETWORK REDUCTION DEVICE, NEURAL NETWORK REDUCTION METHOD, AND STORAGE MEDIUM

(71) Applicant: Oki Electric Industry Co., Ltd., Tokyo (JP)

(72) Inventors: Kohei Yamamoto, Tokyo (JP); Motoko Kagaya, Tokyo (JP); Kurato Maeno, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 324 days.

(21) Appl. No.: 16/878,327

(22) Filed: May 19, 2020

(65) Prior Publication Data

US 2020/0372325 A1 Nov. 26, 2020

(30) Foreign Application Priority Data

May 23, 2019 (JP) .............................. JP2019-096907

(51) Int. Cl.
*G06N 3/04* (2006.01)
*G06F 7/544* (2006.01)
*G06N 3/08* (2006.01)

(52) U.S. Cl.
CPC ......... *G06N 3/0454* (2013.01); *G06F 7/5443* (2013.01); *G06N 3/08* (2013.01)

(58) Field of Classification Search
CPC ........ G06N 3/0454; G06N 3/08; G06N 3/084; G06F 7/5443; G06F 2207/4824
See application file for complete search history.

(56) References Cited

U.S. PATENT DOCUMENTS

2018/0181867 A1 6/2018 Seibold et al.
2019/0378014 A1* 12/2019 Yamamoto ............. G06N 3/084
(Continued)

FOREIGN PATENT DOCUMENTS

JP 2018129033 A 8/2018
JP 2019212206 A 12/2019

OTHER PUBLICATIONS

Jian-Hao Luo, et al., "ThiNet: A Filter Level Pruning Method for Deep Neural Network Compression" [online], Jul. 20, 2017, ICCV2017, searched on Jun. 4, 2018 <https://arxiv.org/abs/1707.06342>.
(Continued)

*Primary Examiner* — Bobbak Safaipour
(74) *Attorney, Agent, or Firm* — Rabin & Berdo, P.C.

(57) ABSTRACT

There is provided a neural network reduction device including: an input section configured to acquire a first neural network including a plurality of processing layers that includes at least one convolutional layer; a generation section configured to generate a third neural network in which at least one second neural network is connected as an additional layer to a stage subsequent to the convolutional layer included in the first neural network; a learning section configured to train the third neural network; a correction section configured to select, as a redundant channel, a channel whose feature value calculated on a basis of a weight parameter of the second neural network establishes a predetermined relationship with a predetermined threshold, delete the redundant channel from the convolutional layer, and correct a weight parameter of the convolutional layer after deletion of the redundant channel on a basis of at least a portion of the weight parameter of the second neural network; a relearning section configured to retrain the third neural network on a basis of correction of the weight parameter of the convolutional layer after the deletion of the (Continued)

redundant channel; and an output section configured to output the retrained third neural network.

13 Claims, 8 Drawing Sheets

(56) References Cited

U.S. PATENT DOCUMENTS

2020/0285957 A1* 9/2020 Miyauchi ............ G06N 3/0454
2022/0172051 A1* 6/2022 Yi ....................... G06K 9/6256

OTHER PUBLICATIONS

Yihui He, et al., "Channel Pruning for Accelerating Very Deep Neural Networks", [online], Oct. 22, 2017, ICCV2017, searched on Dec. 18, 2018 <https://aixiv.org/abs/1707.06168>.

* cited by examiner

NEURAL NETWORK REDUCTION DEVICE, NEURAL NETWORK REDUCTION METHOD, AND STORAGE MEDIUM

CROSS REFERENCE TO RELATED APPLICATION(S)

This application is based upon and claims benefit of priority from Japanese Patent Application No. 2019-096907, filed on May 23, 2019, the entire contents of which are incorporated herein by reference.

BACKGROUND

Embodiments of the present invention relate to a neural network reduction device, a neural network reduction method, and a storage medium.

Neural networks are recently being employed in various fields such as in object detection and the like. However, as progress is being made to increase the functionality of neural networks, there is also a tendency for the number of parameters configuring a neural network to increase. When there are a considerable number of parameters, a load imparted to memory and computation devices during training and during estimating with the neural network also gets larger. There is accordingly research being undertaken into technologies to reduce neural networks.

For example, there is a technology disclosed to reduce filters (weighting filters) in a trained model at each of layers configuring a neural network in units of channels rather than in units of elements (hereafter sometimes referred to as "pruning") (see, for example, Jian-Hao Luo and 2 others, "ThiNet: A Filter Level Pruning Method for Deep Neural Network Compression", (online) Jul. 20, 2017, ICCV2017 (search date Jun. 4, 2018), Internet <https://arxiv.org/abs/1707.06342> (Non Patent Literature 1), and Yihui He and 2 others, "Channel Pruning for Accelerating Very Deep Neural Networks" (online) Oct. 22, 2017, ICCV2017 (search date Dec. 18, 2018), Internet <https://arxiv.org/abs/1707.06168> (Non Patent Literature 2)). In addition, there is a technology disclosed to do the pruning in the minimum unit of elements configuring a neural network (for example, see JP 2018-129033A (Patent Literature 1)).

SUMMARY

Such pruning technologies include a problem that deletion of channel data makes it impossible to utilize the channel data even in the case where the channel data includes information contributing to performance of a neural network. There is accordingly a desire to provide a technology capable of reducing weighting filters in units of channels while suppressing deterioration in the performance of the neural network after reduction.

According to an embodiment of the present invention, there is provided a neural network reduction device including: an input section configured to acquire a first neural network including a plurality of processing layers that includes at least one convolutional layer; a generation section configured to generate a third neural network in which at least one second neural network is connected as an additional layer to a stage subsequent to the convolutional layer included in the first neural network; a learning section configured to train the third neural network; a correction section configured to select, as a redundant channel, a channel whose feature value calculated on a basis of a weight parameter of the second neural network establishes a predetermined relationship with a predetermined threshold, delete the redundant channel from the convolutional layer, and correct a weight parameter of the convolutional layer after deletion of the redundant channel on a basis of at least a portion of the weight parameter of the second neural network; a relearning section configured to retrain the third neural network on a basis of correction of the weight parameter of the convolutional layer after the deletion of the redundant channel; and an output section configured to output the retrained third neural network.

The second neural network may be a fully connected neural network that is connected to the convolutional layer in units of channel data.

The correction section may reduce the number of channels of the convolutional layer after the deletion of the redundant channel, on a basis of application of singular value decomposition to at least a portion of the weight parameter of the second neural network.

The correction section may correct the weight parameter of the convolutional layer after the deletion of the redundant channel, and may delete the second neural network from the third neural network.

The correction section may correct the weight parameter of the convolutional layer after the deletion of the redundant channel on a basis of multiply-accumulate operation of at least a portion of the weight parameter of the second neural network and at least a portion of the weight parameter of the convolutional layer after the deletion of the redundant channel.

In a case where the first neural network includes a plurality of the convolutional layers, the generation section may generate the third neural network in which the second neural networks are connected to respective stages subsequent to the plurality of convolutional layers.

The correction section may determine whether to correct respective weight parameters of the plurality of convolutional layers on a basis of multiply-accumulate operation or on a basis of application of singular value decomposition, with regard to the respective convolutional layers.

The learning section may learn while being subjected to at least one restriction in such a manner that the weight parameter of the second neural network becomes sparse.

The leaning section may enlarge a parameter representing intensity of the restriction in units of epochs or in units of iterations.

The correction section may select, as the redundant channel, a channel whose feature value falls below the predetermined threshold.

The feature value may be a value obtained by computing a sum of magnitude of the weight parameter of the second neural network in units of output channels of the second neural network.

In addition, according to an embodiment of the present invention, there is provided a neural network reduction method including: acquiring a first neural network including a plurality of processing layers that includes at least one convolutional layer; generating a third neural network in which at least one second neural network is connected as an additional layer to a stage subsequent to the convolutional layer included in the first neural network; training the third neural network; selecting, as a redundant channel, a channel whose feature value calculated on a basis of a weight parameter of the second neural network establishes a predetermined relationship with a predetermined threshold, deleting the redundant channel from the convolutional layer, and correcting a weight parameter of the convolutional layer after deletion of the redundant channel on a basis of at least a portion of the weight parameter of the second neural network; retraining the third neural network after correction of the weight parameter; and outputting the retrained third neural network.

In addition, according to an embodiment of the present invention, there is provided a computer-readable storage medium storing a program that causes a computer to function as a neural network reduction device including: an input section configured to acquire a first neural network including a plurality of processing layers that includes at least one convolutional layer; a generation section configured to generate a third neural network in which at least one second neural network is connected as an additional layer to a stage subsequent to the convolutional layer included in the first neural network; a learning section configured to train the third neural network; a correction section configured to select, as a redundant channel, a channel whose feature value calculated on a basis of a weight parameter of the second neural network establishes a predetermined relationship with a predetermined threshold, delete the redundant channel from the convolutional layer, and correct a weight parameter of the convolutional layer after deletion of the redundant channel on a basis of at least a portion of the weight parameter of the second neural network; a relearning section configured to retrain the third neural network after correction of the weight parameter; and an output section configured to output the retrained third neural network.

As described above, according to the embodiments of the present invention, it is possible to provide a technology capable of reducing weighting filters in units of channels while suppressing deterioration in performance of a neural network after reduction.

DETAILED DESCRIPTION OF THE EMBODIMENT(S)

Hereinafter, preferred embodiments of the present invention will be described in detail with reference to the appended drawings. Note that, in this specification and the appended drawings, structural elements that have substantially the same function and structure are denoted with the same reference signs, and repeated explanation of these structural elements will be omitted.

In addition, in this specification and the drawings, a plurality of structural elements that has substantially the same function and structure are sometimes distinguished from each other using different alphabets after the same reference numerals. However, when there is no need in particular to distinguish structural elements that have substantially the same function and structure, the same reference number alone is attached. In addition, similar structural elements in different embodiments are sometimes distinguished from each other using different alphabets after the same reference numerals. However, when there is no need in particular to distinguish such similar structural elements in different embodiments, the same reference numeral alone is attached.

0. Overview

First, an overview of embodiments of the present invention will be described. Neural networks are recently being employed in various fields such as in object detection and the like. However, as progress is being made to increase the functionality of neural networks, there is also a tendency for the number of parameters configuring a neural network to increase. When there are a considerable number of parameters, a load imparted to memory and computation devices during training and during estimating with the neural network also gets larger. There is accordingly research being undertaken into technologies to reduce neural networks.

For example, there is a technology disclosed to reduce filters (weighting filters) in a trained model at each of layers configuring a neural network in units of channels rather than in units of elements (pruning technology). Here, an overview of the technology (pruning technology) of reducing weighting filters in units of channels will be described.

Figure 1:
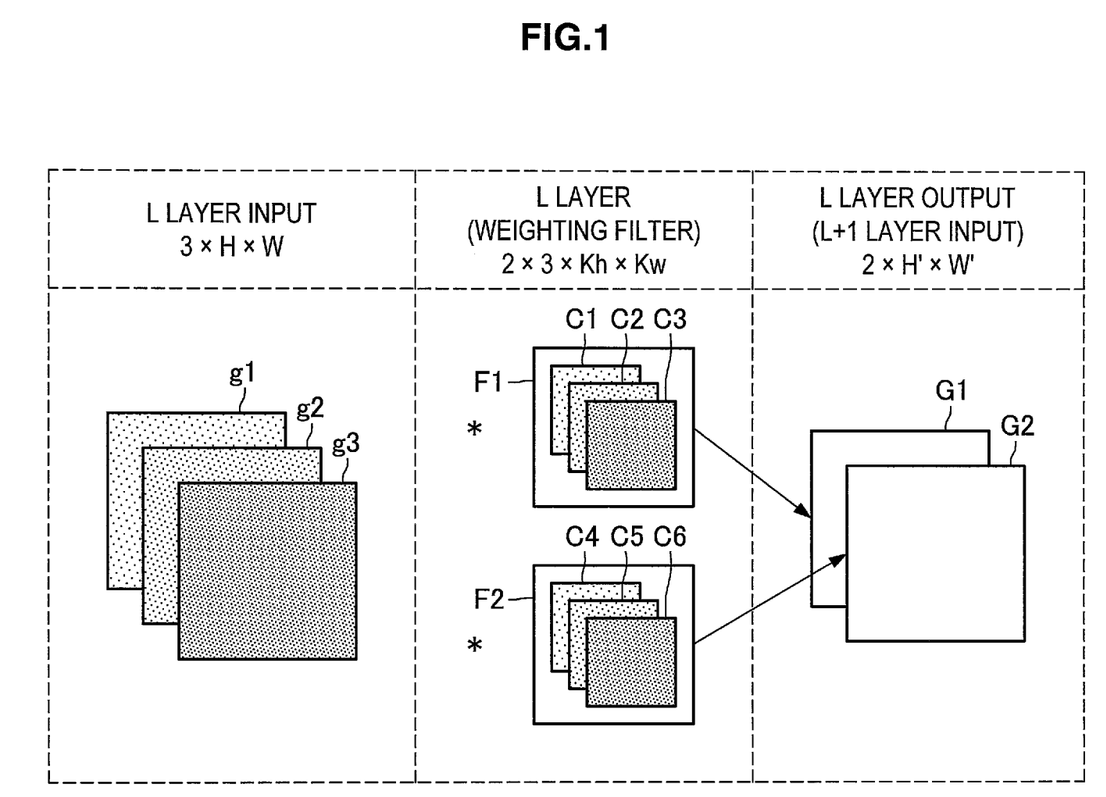
FIG. 1 is a diagram for describing an overview of a pruning technology.
Figure 2:
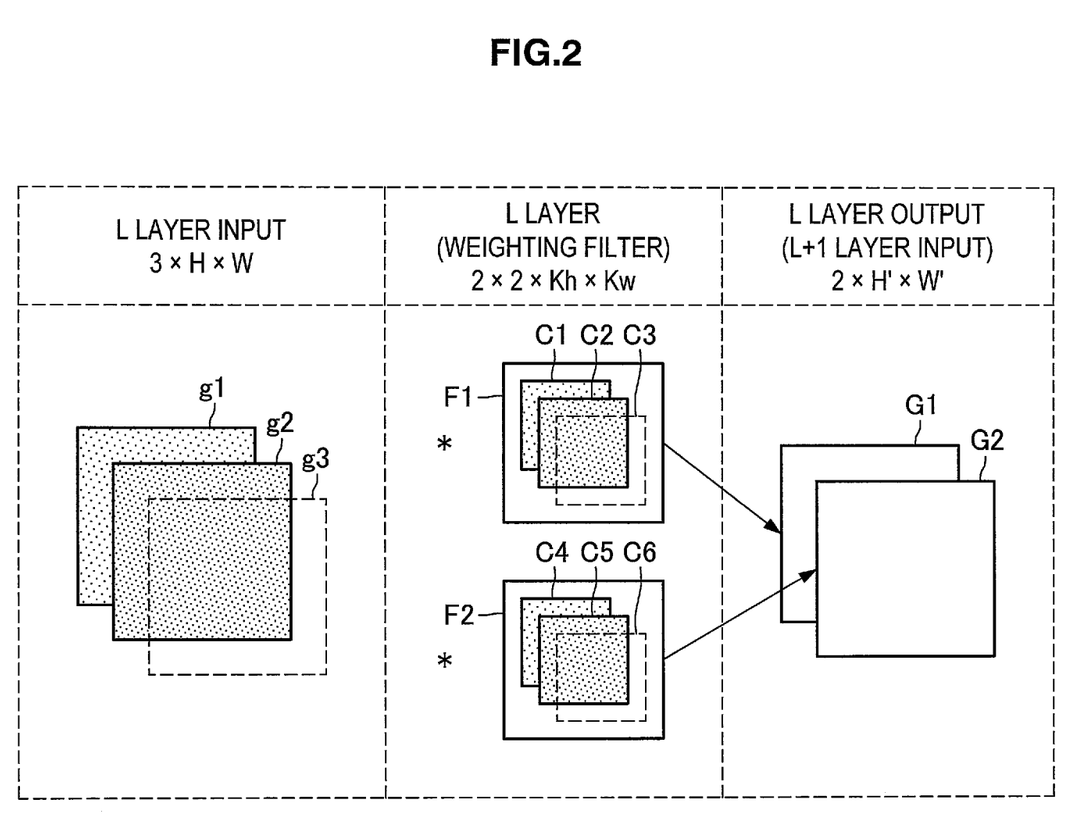
FIG. 2 is a diagram for describing the overview of the pruning technology.

FIG. 1 and FIG. 2 are diagrams for describing an overview of the pruning technology. A neural network is envisaged here to include a plurality of stages of processing layers, and description will focus on an L layer among the plurality of stages of processing layers. With reference to FIG. 1, an "L layer input" which is the input to the L layer is indicated, an "L layer (weighting filter)" is indicated, and an "L layer output" which is the output from the L layer is also indicated.

In the example illustrated in FIG. 1, the L layer includes two filters (filter F1 and filter F2). Each of the filters in the L layer includes three channels (the filter F1 includes channels C1 to C3, and the filter F2 includes channels C4 to C6)). Input data corresponding to each of the three channels (channel data g1 to g3) is input to the respective filters in the L layer. RGB image data is indicated in FIG. 1 as an example of the input data corresponding to each of the three channels.

Each of the filters in the L layer calculates a feature value on the basis of the channel data g1 to g3 and parameters (weights and biases), and outputs the calculated feature value to the L+1 layer (the filter F1 outputs a feature value G1 to the L+1 layer, and the filter F2 outputs a feature value G2 to the L+1 layer). With reference to FIG. 1, respective dimensions of the "L layer input" are illustrated to be 3 (=number of channels), H (=size in height direction), W (=size in width direction). However, with reference to FIG. 1, respective dimensions of the "L layer (weighting filters)" are illustrated to be 2 (=number of filters), 3 (=number of channels), Kh (=size in height direction), Kw (=size in width direction), and respective dimensions of the "L layer output"

are illustrated to be 2 (=number of channels), H' (=size in height direction), W' (=size in width direction).

Next, a case is envisaged in which the channel C3 of the filter F1 is determined to be redundant, and the channel C6 of the filter F2 is also determined to be redundant. In such a case, as illustrated in FIG. 2, the channel C3 and the channel C6 that have been determined to be redundant are deleted. This thereby makes it possible to reduce the neural network.

Note that, with reference to FIG. 2, with channel deletion in the L layer, the number of channels of the "L layer input" is reduced to two, and the number of channels of the "L layer (weighting filters)" is reduced to two. On the other hand, the number of output channels from the "L layer (weighting filters)" remains at two. However, if pruning is performed on the L+1 layer to reduce the number of channels in the L+1 layer, the number of output channels from the L layer would also be reduced in accordance with the reduction in the number of channels of the L+1 layer.

However, the pruning technology described above with reference to FIG. 1 and FIG. 2 includes a problem of deteriorating performance of the neural network after the reduction. For example, in the example illustrated in FIG. 2, the channel C3 of the filter F1 and the channel C6 of the filter F2 are determined to be redundant, and the channel data g3 that is output to the channels C3 and C6 is estimated to be redundant to all weighting filters. Therefore, the channel data g3 is deleted.

Here, if information included in the channel data g3 is completely redundant, amounts of information included in the feature value G1 and the feature value G2 do not change before and after the deletion of the channel data g3. However, in general, information included in the channel data g3 is unlikely to be completely redundant. Therefore, the pruning technology described above with reference to FIG. 1 and FIG. 2 includes a problem that deletion of channel data g3 makes it impossible to utilize the channel data g3 even in the case where the channel data g3 includes information contributing to performance of the neural network.

Therefore, the embodiments of the present invention mainly focus on the technology capable of reducing weighting filters in units of channels while suppressing deterioration in the performance of the neural network after reduction.

Note that, in addition to the technology of reducing the weighting filters in units of channels (the pruning technology), there is a technology disclosed to perform the pruning in the minimum unit of elements configuring a neural network. However, although the technology of performing pruning in the minimum unit of elements configuring the neural network makes it possible to specify a low-performance neuron (element), this is not applicable to the pruning technology.

The overview of the embodiments of the present invention has been described above.

1. Details of First Embodiment

Next, a first embodiment of the present invention will be described.
(1-1. Description of Configuration)

Figure 3:
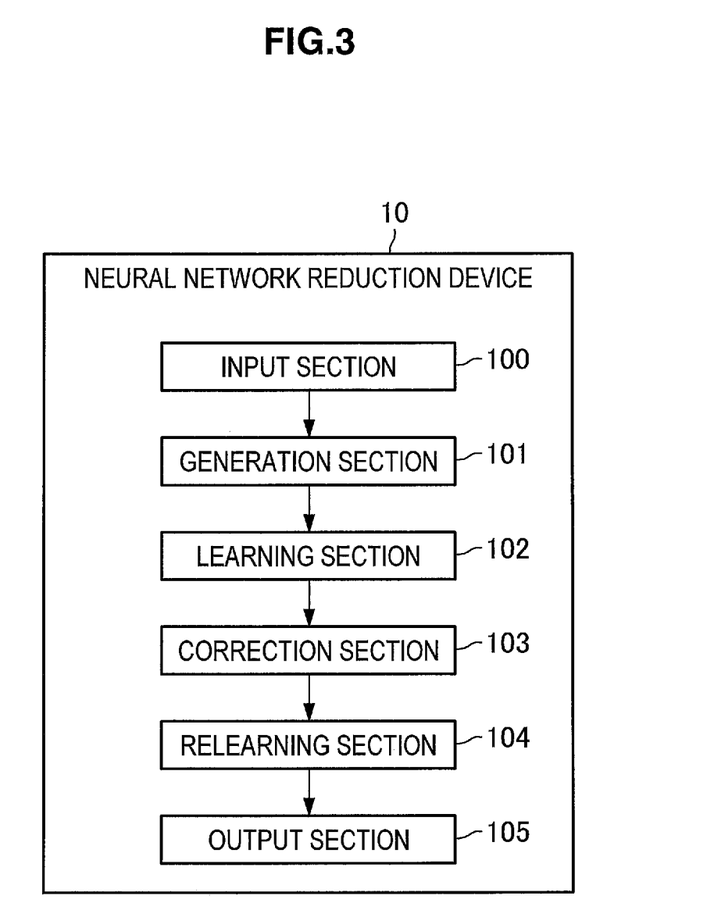
FIG. 3 is a diagram illustrating a functional configuration example of a neural network reduction device according to a first embodiment of the present invention.

FIG. 3 is a diagram illustrating a functional configuration example of a neural network reduction device according to the first embodiment of the present invention. As illustrated in FIG. 3, a neural network reduction device 10 according to the first embodiment of the present invention includes an input section 100, a generation section 101, a learning section 102, a correction section 103, a relearning section 104, and an output section 105.

The neural network reduction device 10 includes a computation device such as a central processing unit (CPU), and the functionality of the neural network reduction device 10 may be realized by a program stored in memory (not illustrated) being expanded into random access memory (RAM) by the CPU and executed. At this time, it is also possible to provide a computer-readable recording medium having the program recorded thereon. Alternatively, the neural network reduction device 10 may be implemented by dedicated hardware, or may be implemented by a combination of a plurality of pieces of hardware.

The input section 100 acquires a reduction target neural network (which is a first neural network and is also referred to as a "reduction target model" hereinafter). The reduction target model includes a plurality of stages of processing layers. The plurality of processing layers includes at least one convolutional layer. The first embodiment of the present invention mainly focuses on a case where the plurality of stages of processing layers includes one convolutional layer. However, it is also possible for the plurality of stages of processing layers to include a plurality of the convolutional layers. The reduction target model acquired by the input section 100 is output to the generation section 101.

The generation section 101 generates a 1×1 convolutional layer (which is a second neural network and is also referred to as an "additional layer" hereinafter) having predetermined weight parameters. Next, the generation section 101 connects the additional layer to a stage (immediately) subsequent to the convolutional layer included in the reduction target model, and generates a training target neural network (which is a third neural network and is also referred to as a "training target model" hereinafter). Note that, in the case where the reduction target model includes a plurality of the convolutional layers, the additional layer may be connected to a stage subsequent to a portion of the plurality of convolutional layers, or may be connected to stages subsequent to all the convolutional layers (except a final layer). The training target model generated by the generation section 101 is output to the learning section 102.

The learning section 102 trains the training target model. For example, the learning section 102 trains the training target model by using backpropagation or the like. This makes it possible to update respective weight parameters of the additional layer and the reduction target model (including the convolutional layer connected to the additional layer). Note that, training data to be used by the learning section 102 for the training is desirably the same as training data used for obtaining a preset weight parameter of the reduction target model. The training target model subjected to the training is output to the correction section 103 as a trained model.

The correction section 103 selects, as a redundant channel, a channel whose feature value calculated on the basis of the weight parameter of the additional layer included in the trained model establishes a predetermined relationship with a predetermined threshold. For example, the correction section 103 selects, as the redundant channel, a channel whose feature value calculated on the basis of the weight parameter of the additional layer falls below the threshold (the channel is considered as a channel whose importance level (contribution level) is not so high). The correction section 103 deletes the redundant channel from the convolutional layer connected to the additional layer, and corrects a weight parameter of the convolutional layer after deletion of the redundant channel on the basis of at least a portion of the weight parameter of the additional layer. The trained model based on the correction of the weight parameter is output to the relearning section 104 as a corrected model.

The relearning section 104 retrains the corrected model. For example, the relearning section 104 trains the corrected model by using the backpropagation or the like. This makes it possible to update the weight parameter of the corrected model. Note that, training data used by the relearning section 104 for the retraining may be the same as the training data used by the learning section 102 for training. The corrected model subjected to the retraining is output to the output section 105 as a retrained model.

The output section 105 outputs the retrained model. It is possible for the output section 105 to output the retrained model in any way. For example, the output section 105 may record the retrained model on a recording medium by outputting the retrained model to the recording medium. Alternatively, the output section 105 may transmit the retrained model to another device via a communication device by outputting the retrained model to the communication device. Alternatively, the output section 105 may display the retrained model on a display device by outputting the retrained model to the display device.

(1-2. Description of Operation)

As described above, the input section 100 acquires the reduction target model. Specifically, the reduction target model includes respective parameters (weight parameters and biases) set for the plurality of stages of processing layers, and configuration information of the plurality of stages of the processing layers. The weight parameters are optimized in advance by using any training data. In addition, the configuration information is information indicating a configuration of a neural network (such as information indicating a fully connected neural network, or information indicating a convolutional neural network, for example).

Figure 4:
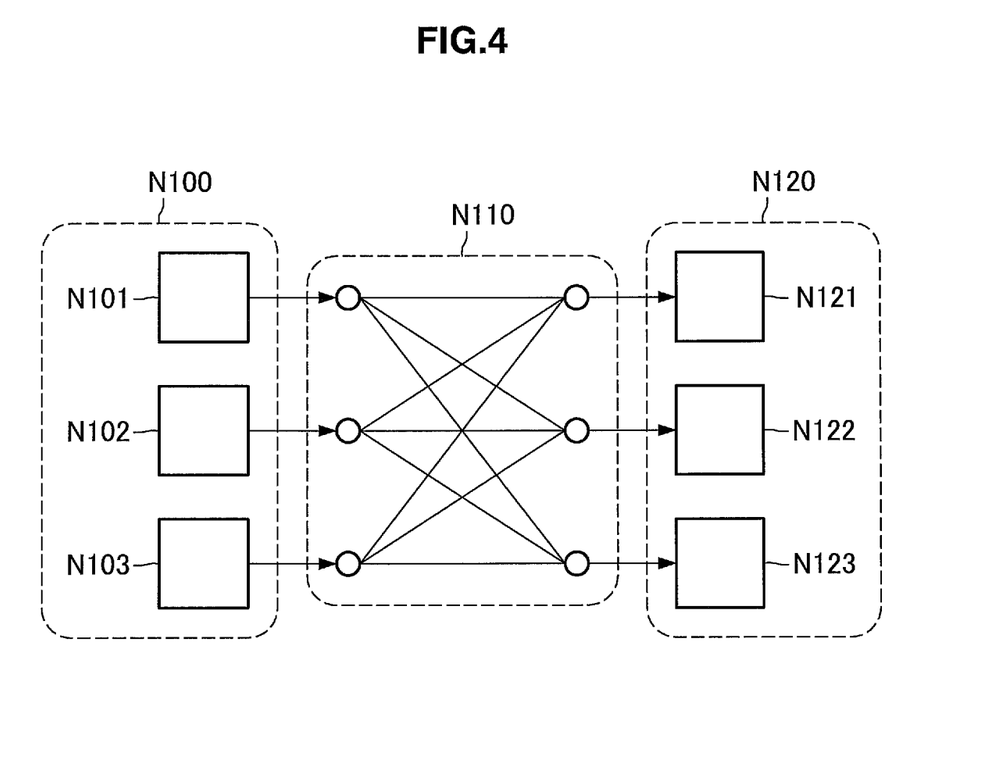
FIG. 4 is a diagram illustrating a connection example of an additional layer.

Next, the generation section 101 generates the additional layer, connects the additional layer to the stage subsequent to the convolutional layer included in the reduction target model, and generates the training target model. FIG. 4 is a diagram illustrating a connection example of the additional layer. With reference to FIG. 4, input data N100 is data input from the convolutional layer included in the reduction target model, and includes input channel data N101 to N103. The generation section 101 connects the additional layer N110 to the input channel data N101 to N103 (connects the additional layer N110 to the convolutional layer in units of channel data). In addition, as illustrated in FIG. 4, the present embodiment assumes a case where the additional layer N110 is a fully connected neural network. However, a specific configuration of the additional layer N110 is not limited. Note that, although the number of channels is three in the example illustrated in FIG. 4, the number of channels is not limited to three.

After the additional layer N110 converts the input channel data N101 to N103, converted data N120 is output. The converted data N120 includes converted channel data N121 to N123. As described above, the number of pieces of channel data in the converted data N120 is the same as the number of pieces of channel data in the input data N100. Here, a relationship represented by the following expression (1) is established where $P_i$ represents i-th input channel data, $w_{ij}$ represents a weighing matrix of the additional layer, and $Q_j$ represents j-th channel of the converted channel data N121 to N123.

$$Q_j = \Sigma_i \sigma(w_{ij}) P_i \qquad (1)$$

Here, $P_i$ is a matrix (or a tensor) of two or more dimensions, and $w_{ij}$ is a scalar value. Therefore, $Q_j$ is calculated from a sum of a matrix and a scalar multiple. As an initial value of $w_{ij}$, it is possible to use an identity matrix or an identity matrix in which tiny noise is added to all elements, for example. In the case where $w_{ij}$ is the identity matrix, the additional layer is identical to an identity function. Therefore, the additional layer does not specifically affect the converted channel data.

For example, any function such as the identity function, a sigmoid function, or a hyperbolic tangent function may be applicable to the function $\sigma(\ )$. In the case where the sigmoid function is applied to the function $\sigma(\ )$, a range of value is restricted to 0 to 1, and $Q_j$ may be represented by a simple sum of $P_i$. On the other hand, in the case where the hyperbolic tangent function is applied to the function $\sigma(\ )$, a range of value is −1 to +1. Therefore, solutions are restricted but it is possible to compute a sum and a difference.

The converted channel data is subjected to computational processing in the convolutional layer connected to a stage subsequent to the additional layer. Note that, the case where the additional layer is connected to the stage subsequent to the one convolutional layer has been described above as an example. However, in the case where the reduction target model includes a plurality of the convolutional layers, the additional layer may be connected to a stage subsequent to a portion of the plurality of convolutional layers, or may be connected to stages subsequent to all the convolutional layers (except the final layer). The generation section 101 generates the training target model in such a way.

Next, the learning section 102 trains the training target model. For example, the learning section 102 trains the training target model by using the backpropagation or the like. This makes it possible to update respective weight parameters of the additional layer and the reduction target model (including the convolutional layer connected to the additional layer). At this time, the learning section 102 preferably learns while being subjected to at least one restriction in such a manner that the weight parameter of the additional layer becomes sparse. More specifically, the learning section 102 trains the training target model by minimizing a loss function $L_{total}$ that is represented by the following expression (2).

$$L_{total} = L_{origin} + \gamma \Sigma_{i,j,l} |w_{ij}^{(l)}| + \lambda \Sigma_{j,l} \|w_j^{(l)}\|_2 \qquad 2$$

Here, a first term in a right-hand side of the expression (2) is an original loss function of the reduction target model. For example, in the case of treating a classification problem, a cross entropy function or the like is used as the loss function. A weighing matrix $w_{ij}^{(l)}$ is a weight vector belonging to a j-th element included in an additional layer of an l-th layer. A second term in the right-hand side of the expression (2) is a general L1-norm regularization term, and is optimized in such a manner that respective weights included in the additional layer approach 0. A third term in the right-hand side of the expression (2) is a general group lasso regularization term, and is optimized in such a manner that all weights connected to j-th channel data $Q_j$ approach 0. $\gamma$ and $\lambda$ are any scalar values for deciding strength of the regularization.

As described above, it is possible to achieve sparse combination with regard to the additional layer (it is possible to make an update in such a manner that the weight parameter of the additional layer becomes sparse) by using not only the original loss function of the reduction target model but also the loss function to which the second term and the third term in the right-hand side of the expression (2) are added. In addition, in the case where all elements of a weight vector (combination of weights) $w_j^{(l)}$ related to the j-th channel data $Q_j$ are sparse, the j-th weight vector $w_j^{(l)}$ may be deemed to have high redundancy. The learning section 102 generates the trained model.

Figure 5:
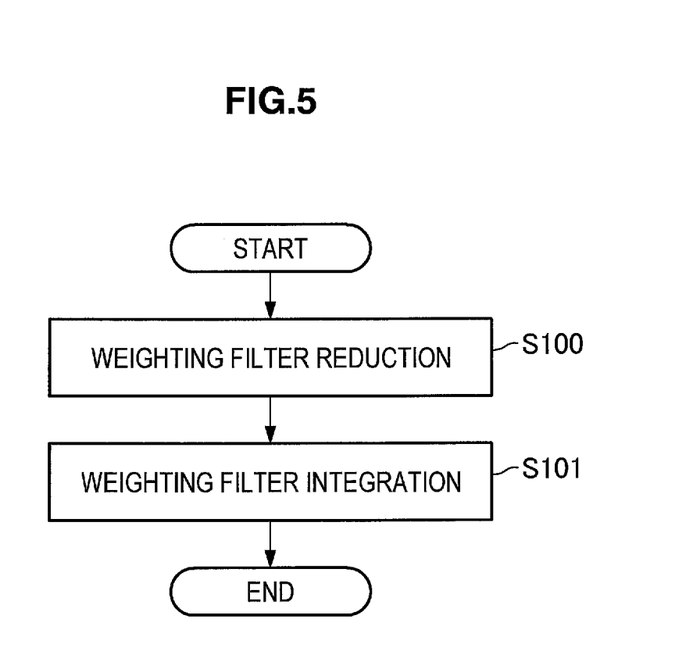
FIG. 5 is a flowchart illustrating a flow of processing performed by a correction section.

Next, the correction section 103 deletes the redundant channel from the convolutional layer connected to the additional layer, and corrects a weight parameter of the convolutional layer after deletion of the redundant channel on the basis of at least a portion of the weight parameter of the additional layer. FIG. 5 is a flowchart illustrating a flow of processing performed by the correction section 103. As illustrated in FIG. 5, the correction section 103 performs a process of reducing a weighting filter connected to the additional layer (S100). Next, the correction section 103 performs a process of integrating the weighting filters connected to the additional layer on the basis of at least a portion of the weight parameter of the additional layer (S101).

Figure 6:
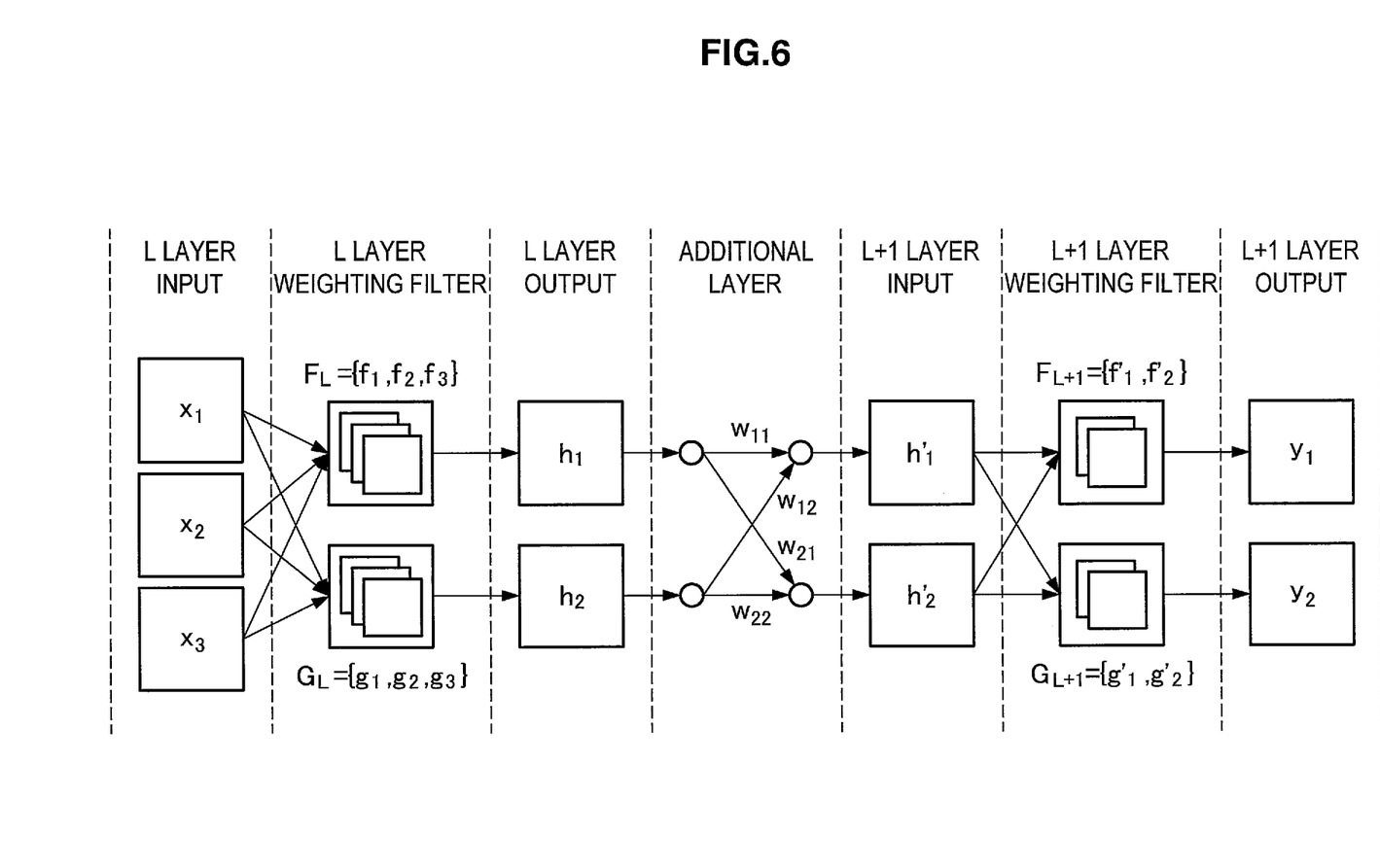
FIG. 6 is a diagram for describing weighting filter reduction processing and weighting filter integration processing.

FIG. 6 is a diagram for describing the weighting filter reduction processing and weighting filter integration processing. FIG. 6 illustrates computational processing in two convolutional layers (L layer and L+1 layer). First, three channels of L layer input channel data x (x1 to x3) are subjected to convolution processing in two L layer weighting filters ($F_L$ and $G_L$), and L layer output data h (h1 and h2) is obtained. Next, h is converted into h' (h1' and h2') via the additional layer described above. Note that, in this example, it is assumed that the identity function is applied to the function 60 of the additional layer. Finally, convolution processing is performed in two L+1 layer weighting filters ($F_{L+1}$ and $G_{L+1}$), and L+1 layer output data y (y1 and y2) are obtained.

Here, the respective weighting filters of the L layer and the L+1 layer, and the weight parameters $w_{ij}$ included in the additional layer are optimized by the learning section 102. Next, details of the weighting filter reduction processing (S100) and the weighting filter integration processing (S101) will be described.

<Weighting Filter Reduction Processing S100>

The correction section 103 selects, as a redundant channel, a channel whose feature value calculated on the basis of the weight parameters $W_{ij}$ of the additional layer included in the trained model establishes a predetermined relationship with a predetermined threshold $\varepsilon$, and deletes the redundant channel from the trained model. For example, the feature value may be a value obtained by computing a sum of magnitudes of the weight parameters of the additional layer in units of output channels of the additional layer. More specifically, for example, in the case where a weighing matrix W of the additional layer includes a column vector $w_j$ whose index $c_j = \|w_j\|_1$ of an L1 norm falls below the predetermined threshold $\varepsilon$, the correction section 103 deletes a weighting filter related to the column vector $w_j$ of the L layer weighting filters from the trained model.

For example, with reference to the example illustrated in FIG. 6, it is assumed that $c_{j=2} = \|w_{j=2}\|_1$ falls below the threshold $\varepsilon$. In such a case, the correction section 103 may delete the weighting filter $G_L$ related to a column vector $_{j=2}$ ($w_{12}$ and $w_{22}$). Note that, here, it has been assumed that there is only one column vector $w_j$ whose $c_j = \|w_j\|_1$ falls below the predetermined threshold $\varepsilon$. However, there may be a plurality of the column vectors $w_j$ whose $c_j = \|w_j\|_1$ falls below the threshold $\varepsilon$. In such a case, it is sufficient to delete respective weighting filters related to the plurality of the column vectors $w_j$ whose $c_j = \|w_j\|_1$ falls below the threshold $\varepsilon$. In such a way, the weighting filter deletion processing (S100) is executed.

<Weighting Filter Integration Processing S101>

The weighting filter integration processing is a process of using property of convolution operation, integrating the additional layer into a convolutional layer connected immediately before, and thereby deleting the additional layer from the trained model after deletion of a weighting filter. Specifically, the correction section 103 corrects a weight parameter of the convolutional layer after deletion of the weighting filter on the basis of multiply-accumulate operation of at least a portion of the weight parameters W of the additional layer and at least a portion of weight parameters of the convolutional layer after deletion of the weighting filter. First, input-output relationships of the L layer may be represented by the following expressions (3) and (4).

$$h_1 = \Sigma_{i=1}^3 x_i * f_i \qquad (3)$$

$$h_2 = \Sigma_{i=1}^3 x_i * g_i \qquad (4)$$

In addition, inputs to the L+1 layer may be represented by the following expressions (5) and (6).

$$h'_1 = w_{11}h_1 + w_{12}h_2 = \Sigma_{i=1}^3 x_i * (w_{11}f_i + w_{12}g_i) \qquad (5)$$

$$h'_2 = w_{21}h_1 + w_{22}h_2 = \Sigma_{i=1}^3 x_i * (w_{21}f_i + w_{22}g_i) \qquad (6)$$

With reference to the expressions (5) and (6), the convolution operation is performed on a weighted sum of $f_j$ and $g_j$ using $W_{ij}$ with regard to the input channel data x in h' (h1' and h2') that has passed through the additional layer. It is possible to calculate the weighted sum in advance independent of the L+1 later input data. Accordingly, it is possible for the correction section 103 to delete the additional layer connected to the stage subsequent to the L layer weighting filters instead of correcting the L layer weighting filters of the trained model after deletion of the weighting filter on the basis of the weight parameters of the additional layer.

Here, when $(w_{11}f_i + w_{12}g_i)$ is substituted for $f_i$ in the expression (3), $h_1'$ in the expression (5) is substituted for $h_1$ in the expression (3). In a similar way, when $(w_{21}f_i + w_{22}g_i)$ is substituted for $g_i$ in the expression (4), $h_2'$ in the expression (6) is substituted for $h_2$ in the expression (4). Note that, if the column vector $w_{j=2}$ ($w_{12}$ and $w_{22}$) is redundant, it is only necessary for the correction section 103 to substitute $w_{11}f_i$ for the weighting filter $f_i$ and add $w_{21}f_i$ instead of the deleted weighting filter $g_i$. As described above, only the weighting filter $f_i$ remains after the integration processing, and this makes it possible to reduce the number of channels of the L layer output.

Next, the following description will focus on effects of the additional layer on the convolution processing in the L+1 layer. When first L+1 layer output data y1 is transformed among pieces of L+1 layer output data y, this is represented by the following expression (7).

$$y_1 = \sum_{i=1}^{2} h'_i * f'_i \qquad (7)$$

$$= \sum_{i=1}^{2} (w_{i1}h_1 + w_{i2}h_2) * f'_i$$

$$= w_{11}h_1 * f'_1 + w_{22}h_2 * f'_2 + w_{12}h_2 * f'_1 + w_{21}h_1 * f'_2$$

Here, a weighing matrix W of elements $w_{ij}$ included in the additional layer is represented by the following expression (8).

$$W = \begin{bmatrix} w_{11} & w_{12} \\ w_{21} & w_{22} \end{bmatrix} \quad (8)$$

In the last row of the expression (7), a first term and a second term are diagonal components ($w_{11}$ and $w_{22}$ in the expression (8)) of the weighing matrix W of the elements $w_{ij}$ included in the additional layer. On the other hand, in the last row of the expression (7), a third term and a fourth term are off-diagonal components ($w_{12}$ and $w_{21}$ in the expression (8)) of the weighing matrix W of the elements $w_{ij}$ included in the additional layer.

As described above, according to the present embodiment, the one-to-one relationship between the pieces of channel data and the weighting filters are disrupted by adding the additional layer, and pieces of channel data that do not correspond the L+1 layer weighting filters $f_1'$ and $f_2'$ are used for training the L+1 layer weighting filters $f_1'$ and $f_2'$. This means that, even if any of the L layer weighting filters is deleted, information regarding the deleted weighting filter is accumulated in the L+1 layer weighting filters as a learning result. The correction section 103 generates the corrected model in such a way. Note that, in the case where the weighing matrix W is a diagonal matrix, the third term and the fourth term are deleted from the last row of the expression (7), and this makes it possible to maintain the one-to-one relationship between the pieces of channel data and the weighting filters.

Next, the relearning section 104 trains the corrected model. Note that, as described above, training data to be used by the relearning section 104 for retraining may be the same as the training data used by the learning section 102 for training. Note that, as the loss function, the relearning section 104 uses a loss function $L_{origin}$ for the training instead of the loss function $L_{total}$ that has been used by the learning section 102 for the training. The corrected model subjected to the retraining is output to the output section 105 as a retrained model.

Next, the output section 105 outputs the retrained model. As described above, it is possible for the output section 105 to output the retrained model in any way.

(1-3. Description of Effects)

According to the first embodiment of the present invention, the generation section 101 connects the additional layer to the reduction target model, and the learning section 102 trains the model. This makes it possible to train the model while information included in channel data, which is deleted when using the conventional reduction technology, flows into a weighting filter of another channel. Accordingly, even when a weighting filter is deleted from the reduction target model, it is possible to suppress deterioration in performance of the model to a low level after deletion of the weighting filter.

In addition, according to the first embodiment of the present invention, the additional layer may be imported into the reduction target model through the weighting filter integration processing performed by the correction section 103. This makes it possible to eliminate the additional layer connected to the reduction target model. Therefore, it is possible to achieve an effect of omitting processing of the additional layer.

In addition, according to the first embodiment of the present invention, the relearning section 104 retrains the model. This makes it possible to achieve an effect of recovering performance of the model deteriorated due to reduction of a weighting filter.

The details of the first embodiment of the present invention have been described above.

2. Details of Second Embodiment

Next, details of a second embodiment of the present invention will be described.

Figure 7:
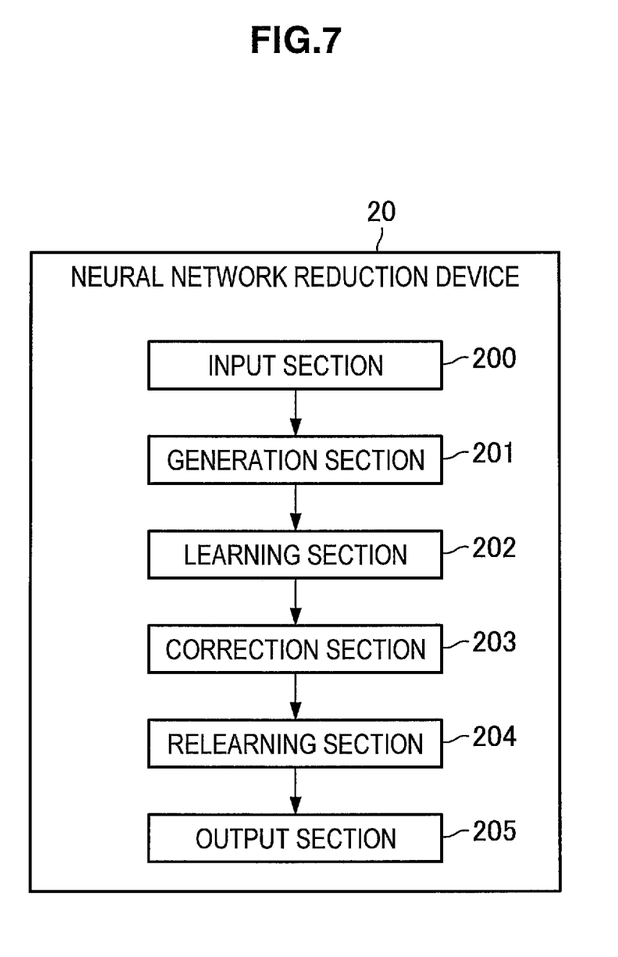
FIG. 7 is a diagram illustrating a functional configuration example of a neural network reduction device according to a second embodiment of the present invention.

FIG. 7 is a diagram illustrating a functional configuration example of a neural network reduction device according to the second embodiment of the present invention. As illustrated in FIG. 7, a neural network reduction device 20 according to the second embodiment of the present invention includes an input section 200, a generation section 201, a learning section 202, a correction section 203, a relearning section 204, and an output section 205. Here, the input section 200, the generation section 201, the learning section 202, the relearning section 204, and the output section 205 are respectively similar to the input section 100, the generation section 101, the learning section 102, the relearning section 104, and the output section 105.

The correction section 203 reduces the number of channels of the convolutional layer after deletion of the redundant channel, on the basis of application of singular value decomposition to at least a portion of the weight parameters of the additional layer. A trained model based on the reduction in the number of channels is output to the relearning section 204 as a corrected model.

(2-2. Description of Operation)

In comparison with the neural network reduction device 10 according to the first embodiment of the present invention, the neural network reduction device 20 according to the second embodiment of the present invention includes the correction section 203 instead of the correction section 103. Therefore, hereinafter, descriptions of operation of the input section 200, the generation section 201, the learning section 202, the relearning section 204, and the output section 205 are omitted, and operation of the correction section 203 will be described.

Figure 8:
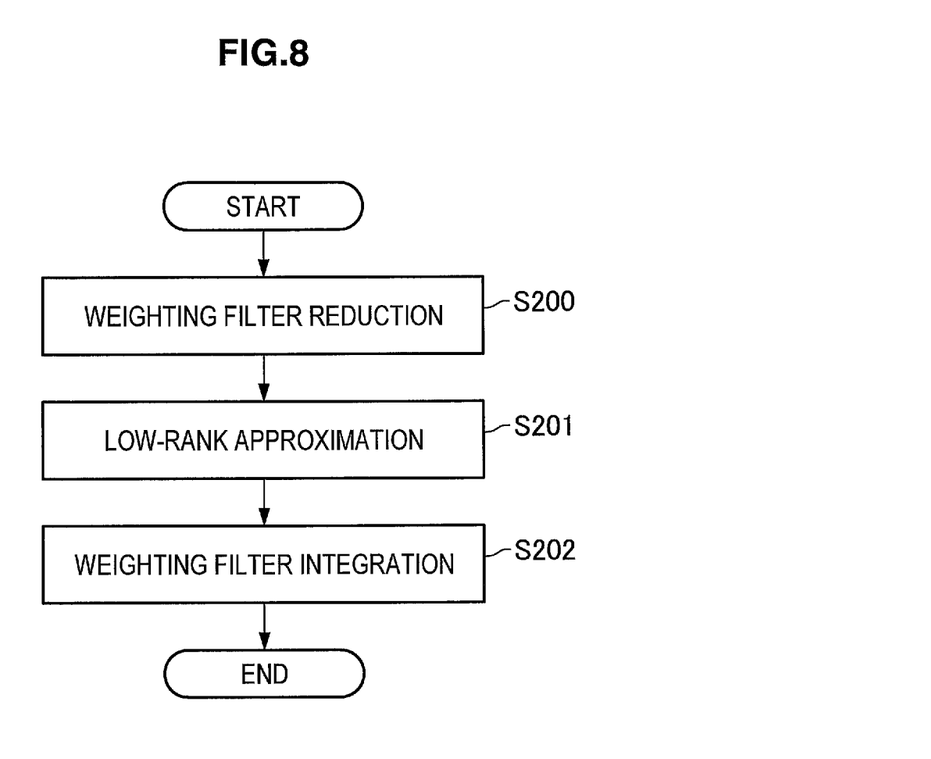
FIG. 8 is a flowchart illustrating a flow of processing performed by a correction section.

FIG. 8 is a flowchart illustrating a flow of processing performed by the correction section 203. As illustrated in FIG. 8, the correction section 203 performs a process of reducing a weighting filter connected to the additional layer (S200). Next, the correction section 203 reduces the number of channels of the convolutional layer after deletion of the weighting filter through low-rank approximation (S201). Next, the correction section 203 performs a process of integrating the weighting filters in which the number of channels is reduced on the basis of at least a portion of the weight parameters of the additional layer (S202). The weighting filter reduction processing (S200) may be executed in a way similar to the weighting filter reduction processing (S100) according to the first embodiment of the present invention. Therefore, hereinafter, details of the low-rank approximation (S201) and the integration processing (S202) will be described.

<Low-Rank Approximation S201>

It is assumed that the dimension of the weighting matrix W of the additional layer is changed form m×m to m×n (n≤m) through the weighting filter reduction processing (S200) (it is assumed that $h_1'$ to $h_m'$ is changed into $h_1'$ to $h_n'$ in the example illustrated in FIG. 6). At this time, it is possible for the correction section 203 to reduce the number of times of computation in the L layer weighting filters by applying the singular value decomposition to the weighting matrix W.

Specifically, the correction section 203 applies the singular value decomposition to the weighting matrix W, and thereby obtains $W=USV^T$. Note that, $U \in R^{m \times m}$, and $V \in R^{n \times n}$ are satisfied (in other words, U is an m×m dimensional real number, S is an m×n dimensional real number, and V is an n×n dimensional real number). Here, it is possible for the correction section 203 to obtain a weighting matrix $W'=U'S'V'^T$ after the low-rank approximation by performing the low-rank approximation on the basis of magnitudes of singular values. Note that, $U' \in R^{m \times k}$, $S' \in R^{k \times k}$, and $k \leq n \leq m$ are satisfied where a dimension k is any natural number.

<Weighting Filter Integration Processing S202>

In contrast to the first embodiment according to the present invention, the correction section 203 uses a matrix U'S' instead of the weighting matrix W with regard to calculation of a weighted sum (expression (5) and (6)) performed in the weighting filter integration processing S101 on the basis of a result of the low-rank approximation. This makes it possible to reduce the number of pieces of the L layer output channel data from m to k (it is possible to reduce the number of the L layer weighting filters to k). However, it is necessary to match the dimension of the weighting filters W to the (n) number of pieces of the L+1 layer input data (because restoration is necessary). Therefore, the correction section 203 does not delete the weighting matrix W of the additional layer, but substitutes a matrix V' for the weighting matrix W.

Accordingly, although the first embodiment of the present invention makes it possible to delete the additional layer connected to the stage subsequent to the L layer weighting filters from the reduction target model, the reduction target model according to the second embodiment of the present invention includes a remained portion of the additional layer connected to the stage subsequent to the L layer weighting filters. However, according to the second embodiment of the present invention, it is possible to replace a portion of convolution processing having a larger computational load with processing of the additional layer having a smaller computational load (processing using the matrix V').

(2-3. Description of Effects)

According to the second embodiment of the present invention, it is possible not only to reduce the number of L layer weighting filters through the weighting filter reduction processing (S200), but also further reduce the number of L layer weighting filters through the weighting filter integration processing (S202) based on a result of the low-rank approximation (S201). Therefore, according to the second embodiment of the present invention, it is possible to achieve an effect of reducing a computational load of the convolution processing performed by using the L layer weighting filters.

The details of the second embodiment of the present invention have been described above.

3. Hardware Configuration Example

Next, a hardware configuration example of the neural network reduction device 10 according to the first embodiment of the present invention will be described. Note that, a hardware configuration example of the neural network reduction device 20 according to the second embodiment of the present invention may be similar to that of the first embodiment.

Hereinafter, a hardware configuration example of an information processing device 900 will be described as the hardware configuration example of the neural network reduction device 10 according to the first embodiment of the present invention. Note that, the hardware configuration example of the information processing device 900 described below is merely an example of a hardware configuration of the neural network reduction device 10. The hardware configuration of the neural network reduction device 10 may accordingly be achieved by deleting an unwanted structural element from the hardware configuration of the information processing device 900 described below, or may be achieved by adding a new structural element thereto.

Figure 9:
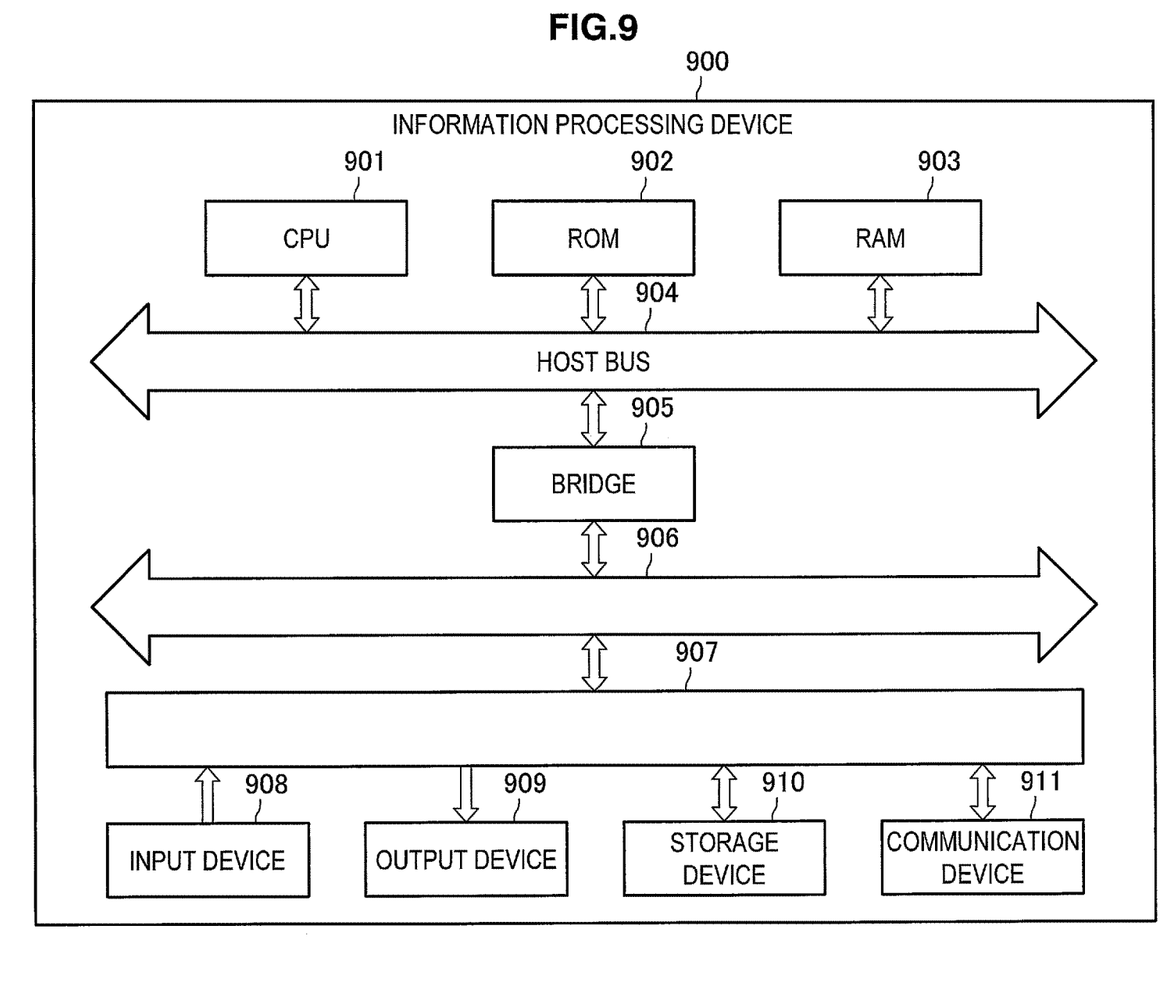
FIG. 9 is a diagram illustrating a hardware configuration of an information processing device serving as an example of the neural network reduction device according to the embodiments of the present invention.

FIG. 9 is a diagram illustrating the hardware configuration of the information processing device 900 serving as an example of the neural network reduction device 10 according to the first embodiment of the present invention. The information processing device 900 includes a central processing unit (CPU) 901, read only memory (ROM) 902, random access memory (RAM) 903, a host bus 904, a bridge 905, an external bus 906, an interface 907, an input device 908, an output device 909, a storage device 910, and a communication device 911.

The CPU 901 functions as a computational processing device and a control device, and controls overall operations inside the information processing device 900 in accordance with various programs. The CPU 901 may be a microprocessor. The ROM 902 stores programs, computation parameters, and the like to be used by the CPU 901. The RAM 903 temporarily stores programs to be used in execution by the CPU 901, and temporarily stores parameters and the like that are appropriately changed by such execution. These structural elements are connected to each other by the host bus 904 including a CPU bus or the like.

The host bus 904 is connected via the bridge 905 to the external bus 906 such as a Peripheral Component Interconnect/Interface (PCI) bus. Note that, the host bus 904, the bridge 905, and the external bus 906 are not necessarily separate configurations, and a configuration may be adopted in which the functionalities thereof are implemented by a single bus.

The input device 908 includes an input section for a user to input information with a mouse, a keyboard, a touchscreen, a button, a microphone, a switch, a lever, or the like, an input control circuit to generate an input signal on the basis of input by the user, and to output to the CPU 901, and the like. The user who operates the information processing device 900 is able to input various kinds of data to the information processing device 900 and to instruct the information processing device 900 to perform various kinds of processing operations, by operating the input device 908.

The output device 909 includes, for example, a display device such as a cathode ray tube (CRT) display device, a liquid crystal display (LCD) device, an organic light emitting diode (OLED) device, or a lamp, and an audio output device such as a speaker.

The storage device 910 is a device employed for data storage. The storage device 910 may include a storage medium, a recording device to record data on the storage medium, a readout device to read data from the storage medium, an erasing device to delete data recorded on the storage medium, or the like. The storage device 910 is, for example, implemented by a hard disk drive (HDD). The storage device 910 drives a hard disk, and stores programs to be executed by the CPU 901 and various data.

The communication device 911 is a communication interface including, for example, a communication device or the like for connecting to a network. The communication device 911 may be compatible with wireless communication, and may be compatible with wired communication.

This concludes the description of the hardware configuration example of the neural network reduction device 10 according to the first embodiment of the present invention.

4. Conclusion

As described above, according to the embodiments of the present invention, there is provided the neural network reduction device including the input section, the generation section, the learning section, the correction section, the relearning section, and the output section. The input section acquires the first neural network including a plurality of processing layers that includes at least one convolutional layer. The generation section generates the third neural network in which at least one second neural network is connected as the additional layer to the stage subsequent to the convolutional layer included in the first neural network. The learning section trains the third neural network.

The correction section selects, as a redundant channel, a channel whose feature value calculated on a basis of a weight parameter of the second neural network establishes a predetermined relationship with a predetermined threshold, deletes the redundant channel from the convolutional layer, and corrects a weight parameter of the convolutional layer after deletion of the redundant channel on the basis of at least a portion of the weight parameter of the second neural network. The relearning section retrains the third neural network on the basis of the correction of the weight parameter of the convolutional layer after the deletion of the redundant channel. The output section outputs the retrained third neural network.

Such a configuration makes it possible to reduce weighting filters in units of channels while suppressing deterioration in the performance of the neural network after reduction.

Although details of the preferable embodiments of the present invention have been described above with reference to the appended drawings, the embodiments of the present invention are not limited to the above-described examples. It will be clear to a person of ordinary skill in the art of the present invention that various modifications and improvements may be obtained within the scope of the technological concept recited by the scope of the patent claims, and these should obviously be understood as belonging to the range of technology of the present invention.

For example, with reference to the first embodiment of the present invention and the second embodiment of the present invention, the examples in which the relearning section 104 or 204 does relearning after executing the weighting filter reduction processing (S100 or S200) have been described. However, it is also possible to determine an importance level each time the learning section 102 or 202 updates a weight parameter, and it is possible to successively delete a weight parameter. In this case, Step S100 and the relearning section 104 may be skipped with regard to the first embodiment of the present invention, and Step S200 and the relearning section 204 may be skipped with regard to the second embodiment of the present invention.

In addition, according to the first embodiment of the present invention and the second embodiment of the present invention, the loss functions used for learning performed by the learning section 102 and 202 include the parameters $\gamma$ and $\lambda$ that represent intensities of the restriction. Any one of the values of $\gamma$ and $\lambda$ that represent intensities of the restriction does not have to be fixed, and may be gradually increased during the training.

For example, the learning sections 102 or 202 may increase the parameters that represent intensities of restriction each time a same data set is repeatedly executed (in other words, the parameters may be increased in units of epochs). Alternatively, the learning sections 102 or 202 may increase the parameters that represent intensities of restriction each time a data set is updated (in other words, the parameters may be increased in units of iterations). It is possible to increase the parameters that represent intensities of restriction in any way. For example, the parameters that represent intensities of restriction may be increased monotonically, may be increased linearly, may be increased quadratically, or may be increased logarithmically.

The first embodiment of the present invention and the second embodiment of the present invention mainly focus on the case where the reduction target model includes one convolutional layer. However, it is possible to assume a case where the reduction target model includes a plurality of the convolutional layers. In such a case, the generation section 201 or 202 may generate a training target model in which the additional layers are connected to respective stages subsequent to the plurality of convolutional layers. At this time, the plurality of convolutional layers and the respective additional layers connected to the plurality of convolutional layers may be subjected to the processes performed by the learning section 101 or 202, the correction section 103 or 203, and the relearning section 104 or 204.

A this time, the correction section 103 or 203 may determine whether to correct respective weight parameters of the plurality of convolutional layers on the basis of multiply-accumulate operation (according to the first embodiment of the present invention) or on the basis of application of singular value decomposition (according to the second embodiment of the present invention), with regard to the respective convolutional layers. For example, if the number of times of multiply-accumulate operation during convolution operation is a threshold or more, the correction section 103 or 203 may correct the weight parameters on the basis of application of singular value decomposition to drastically reduce the number of times of multiply-accumulate operation. On the other hand, if the number of times of multiply-accumulate operation during convolution operation falls below the threshold, the correction section 103 or 203 may correct the weight parameters on the basis of the multiply-accumulate operation. At this time, the same threshold may be used for all the convolutional layers, or different thresholds may be used for respective convolutional layers.

What is claimed is:
1. A neural network reduction device comprising:
a computing device, and
a non-transitory storage medium containing program instructions stored therein, execution of which by the computing device causes the neural network reduction device to perform the functions of:
acquiring a first neural network including a plurality of processing layers that includes at least one convolutional layer;
generating a third neural network in which at least one second neural network is connected as an additional layer to a stage subsequent to the convolutional layer included in the first neural network;
training the third neural network;

selecting, as a redundant channel, a channel whose feature value calculated on a basis of a weight parameter of the second neural network establishes a predetermined relationship with a predetermined threshold, deleting the redundant channel from the convolutional layer, and correcting a weight parameter of the convolutional layer after deletion of the redundant channel on a basis of at least a portion of the weight parameter of the second neural network;

retraining the third neural network on a basis of correction of the weight parameter of the convolutional layer after the deletion of the redundant channel; and outputting the retrained third neural network.

2. The neural network reduction device according to claim 1, wherein the second neural network is a fully connected neural network that is connected to the convolutional layer in units of channel data.

3. The neural network reduction device according to claim 1, wherein the functions further include reducing the number of channels of the convolutional layer after the deletion of the redundant channel, on a basis of application of singular value decomposition to at least a portion of the weight parameter of the second neural network.

4. The neural network reduction device according to claim 2, wherein the functions further include correcting the weight parameter of the convolutional layer after the deletion of the redundant channel, and deleting the second neural network from the third neural network.

5. The neural network reduction device according to claim 3, wherein the functions further include correcting the weight parameter of the convolutional layer after the deletion of the redundant channel on a basis of multiply—accumulate operation of at least a portion of the weight parameter of the second neural network and at least a portion of the weight parameter of the convolutional layer after the deletion of the redundant channel.

6. The neural network reduction device according to claim 1, wherein the functions further include, in a case where the first neural network includes a plurality of the convolutional layers, generating the third neural network in which the second neural networks are connected to respective stages subsequent to the plurality of convolutional layers.

7. The neural network reduction device according to claim 6, wherein the functions further include determining whether to correct respective weight parameters of the plurality of convolutional layers on a basis of multiply—accumulate operation or on a basis of application of singular value decomposition, with regard to the respective convolutional layers.

8. The neural network reduction device according to claim 1, wherein the functions further include learning while being subjected to at least one restriction in such a manner that the weight parameter of the second neural network becomes sparse.

9. The neural network reduction device according to claim 8, wherein the functions further include enlarging a parameter representing intensity of the restriction in units of epochs or in units of iterations.

10. The neural network reduction device according to claim 1, wherein the functions further include selecting, as the redundant channel, a channel whose feature value falls below the predetermined threshold.

11. The neural network reduction device according to claim 1, wherein the feature value is a value obtained by computing a sum of magnitude of the weight parameter of the second neural network in units of output channels of the second neural network.

12. A neural network reduction method, comprising:
acquiring a first neural network including a plurality of processing layers that includes at least one convolutional layer;
generating a third neural network in which at least one second neural network is connected as an additional layer to a stage subsequent to the convolutional layer included in the first neural network;
training the third neural network;
selecting, as a redundant channel, a channel whose feature value calculated on a basis of a weight parameter of the second neural network establishes a predetermined relationship with a predetermined threshold, deleting the redundant channel from the convolutional layer, and correcting a weight parameter of the convolutional layer after deletion of the redundant channel on a basis of at least a portion of the weight parameter of the second neural network;
retraining the third neural network after correction of the weight parameter; and
outputting the retrained third neural network.

13. A non-transitory computer-readable storage medium storing program instructions, execution of which by a computing device causes a neural network reduction device to perform the functions of:
acquiring a first neural network including a plurality of processing layers that includes at least one convolutional layer;
generating a third neural network in which at least one second neural network is connected as an additional layer to a stage subsequent to the convolutional layer included in the first neural network;
training the third neural network;
selecting, as a redundant channel, a channel whose feature value calculated on a basis of a weight parameter of the second neural network establishes a predetermined relationship with a predetermined threshold, deleting the redundant channel from the convolutional layer, and correcting a weight parameter of the convolutional layer after deletion of the redundant channel on a basis of at least a portion of the weight parameter of the second neural network;
retraining the third neural network after correction of the weight parameter; and
outputting the retrained third neural network.

\* \* \* \* \*